(12) United States Patent
Nielsen et al.

(10) Patent No.: US 8,155,061 B2
(45) Date of Patent: *Apr. 10, 2012

(54) METHOD OF AND SYSTEM FOR TRANSMITTING SIGNALS USING FREQUENCY HOPPING

(75) Inventors: Martin Sandal Nielsen, Nebel (DK); Erik Bundsbaek Mouridsen, Skjern (DK); Henning Sorensen, Lem (DK); Jakob Trelborg, Hemmet (DK)

(73) Assignee: VKR Holding A/S (DK)

( * ) Notice: Subject to any disclaimer, the term of this patent is extended or adjusted under 35 U.S.C. 154(b) by 278 days.

This patent is subject to a terminal disclaimer.

(21) Appl. No.: 12/062,261

(22) Filed: Apr. 3, 2008

(65) Prior Publication Data

US 2009/0036057 A1 Feb. 5, 2009

Related U.S. Application Data

(63) Continuation of application No. 10/500,626, filed on Feb. 4, 2005, now Pat. No. 7,356,041.

(51) Int. Cl.
*H04W 4/00* (2009.01)
*H04J 3/00* (2006.01)
*H04J 3/24* (2006.01)
*H04B 7/00* (2006.01)

(52) U.S. Cl. ........ 370/329; 370/335; 370/345; 370/349; 455/434; 455/450; 455/509

(58) Field of Classification Search .......... 370/328–333, 370/335, 337, 342, 344–347, 349, 350, 442; 375/132–136; 455/434, 450–452.1, 509, 455/515

See application file for complete search history.

(56) References Cited

U.S. PATENT DOCUMENTS

| | | | | |
|---|---|---|---|---|
| 5,956,641 | A * | 9/1999 | Bruckert et al. | 455/442 |
| 6,240,126 | B1 * | 5/2001 | Ohashi et al. | 375/132 |
| 6,466,608 | B1 * | 10/2002 | Hong et al. | 375/137 |
| 6,549,784 | B1 * | 4/2003 | Kostic et al. | 455/501 |
| 6,687,239 | B1 * | 2/2004 | Koprivica | 370/341 |
| 6,760,317 | B1 * | 7/2004 | Honkanen et al. | 370/329 |
| 7,027,418 | B2 * | 4/2006 | Gan et al. | 370/329 |
| 7,356,041 | B2 * | 4/2008 | Nielsen et al. | 370/431 |
| 7,570,614 | B2 * | 8/2009 | Treister et al. | 370/329 |

FOREIGN PATENT DOCUMENTS

| | | |
|---|---|---|
| DE | 9319508 | 2/1994 |
| DE | 19502839 C1 | 6/1996 |
| DE | 19705502 A1 | 8/1998 |
| EP | 0428322 A1 | 5/1991 |
| WO | WO02/11097 A | 2/2002 |

OTHER PUBLICATIONS

Extended Search Report, EP Patent Application No. 05015582.9, dated Oct. 7, 2005.

* cited by examiner

*Primary Examiner* — Simon Nguyen
(74) *Attorney, Agent, or Firm* — Cantor Colburn LLP

(57) ABSTRACT

Method of and system for transmitting signals, e.g. control signals, request signals, interrogation signals etc. in a control system comprising at least two units, wherein at least one of said units is designed to operate as a master unit and wherein at least one of said units is designed to operate as a slave unit,
whereby a plurality of channels may be used for the transmission,
whereby a first unit performs the steps of detecting a vacant channel and transmitting a signal via said vacant channel, and
whereby at least one other unit performs the step of scanning the channels for transmitted signals.

21 Claims, 6 Drawing Sheets

METHOD OF AND SYSTEM FOR TRANSMITTING SIGNALS USING FREQUENCY HOPPING

CROSS REFERENCE TO RELATED APPLICATION

Figure 1:
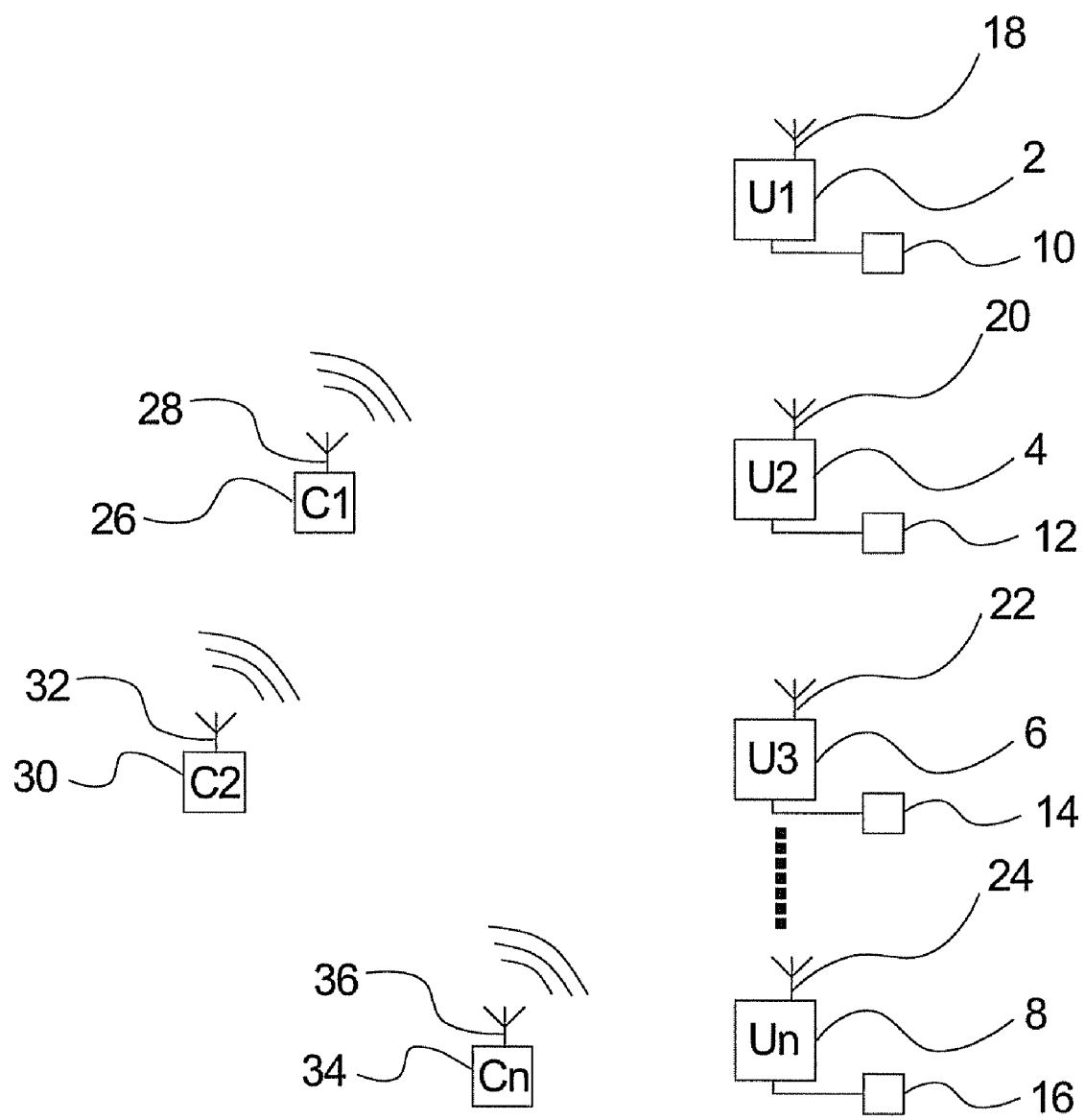

This application is a continuation of and claims the benefit of U.S. patent application Ser. No. 10/500,626 filed on 4 Feb. 2005, the contents of which are herein incorporated by reference in their entirety.

FIELD OF THE INVENTION

The invention relates to a method of transmitting signals, e.g. control signals, request signals, interrogation signals etc. in a control system comprising at least two units, wherein at least one of said units is designed to operate as a master unit and wherein at least one of said units is designed to operate as a slave unit, as specified in the preamble of claim 1.

The invention also relates to a system for transmitting signals, e.g. control signals, request signals, interrogation signals etc. comprising at least two units, wherein at least one of said units is designed to operate as a master unit and wherein at least one of said units is designed to operate as a slave unit, as specified in the preamble of claim 14.

BACKGROUND OF THE INVENTION

When performing remote control of various devices including devices normally utilized in normal homes, such as wireless doorbells, wireless operation of windows, doors, garage doors, etc, it is a normal procedure to use equipment operating on a specific frequency which is common for a multitude of devices. This may of course lead to non-operation and/or mal-operation of the devices, due to collision, if more than one user, located in essentially the same area, each tries to operate a device using the same frequency.

Further, systems have been arranged to overcome these problems. However, these solutions tends to be relatively complex and costly, e.g. the Blue Tooth solution. These solutions have not found widespread use in everyday use in relation to home operation.

Thus, an objective of the invention is to provide a method and a system by means of which control signals, interrogation signals etc. may be transmitted between units in a system utilizing more than one channel.

It is a further objective to provide such a method and such a system, which is cost effective and relatively uncomplicated.

A still further objective is to provide such a method and such a system, which is reliable and effective.

It is also an objective to provide such a system, which is may readily be utilized in relation with ordinary equipment used in houses, buildings, homes house holdings etc.

These and other objectives are achieved by the invention as explained in the following.

SUMMARY OF THE INVENTION

As specified in claim 1, the invention relates to a method of transmitting signals, e.g. control signals, request signals, interrogation signals etc. in a control system comprising at least two units, wherein at least one of said units is designed to operate as a master unit and wherein at least one of said units is designed to operate as a slave unit, whereby a plurality of channels may be used for the transmission, whereby a master unit performs the steps of detecting a vacant channel and transmitting a signal via said vacant channel, and whereby at least one slave unit performs the step of scanning the channels for transmitted signals.

Hereby a method is provided by means of which signals in an effective, reliable and relatively uncomplicated manner may be transmitted between units in a system utilizing more than one channel.

Advantageously, as specified in claim 2, said signal transmitted by said first unit may comprise a preamble having a length corresponding at least to the time required for said at least one other unit to test said channels for a transmitted signal.

Hereby it is achieved that a slave unit comprised in a system may have sufficient time for testing all available channels during the length of the preamble.

Optionally, as specified in claim 3, said step of detecting a vacant channel may comprise the step of testing for a carrier wave.

According to a preferred embodiment, as specified in claim 4, said at least one slave unit may perform the step of testing said channels for a transmitted signal by testing said preamble for a predefined characteristic, e.g. a symbol, a bit sequence etc.

According to a further preferred embodiment, as specified in claim 5, said at least one slave unit may perform the step of testing said channels for a predefined characteristic, e.g. a symbol, a bit sequence etc. repeated a number of times, for example two, three, four times etc.

Preferably, as specified in claim 6, said at least one slave unit may perform the step of testing said channels for a transmitted signal by testing for a carrier wave.

In a preferred simple form, a specified in claim 7, the number of said plurality of channels may be two.

In a further preferable simple form, as specified in claim 8, the number of said plurality of channels may be three.

Advantageously, as specified in claim 9, the number of said plurality of channels may at least be four and at the most 15.

Preferably, as specified in claim 10, said master unit may perform the step of testing for a vacant channel by scanning the plurality of channels.

In a preferred embodiment, as specified in claim 11, said scanning performed by said master unit may be performed in accordance with predefined algorithms, e.g. possibly taking into account previous transmissions performed.

Advantageously, as specified in claim 12, said at least one slave unit may perform the step of scanning the channels for transmitted signals by continuously or essentially continuously scanning the channels in a sequential order, or it might be done in accordance with predefined algorithms.

In a further preferred form, as specified in claim 13, said master unit may wait for a reply when having transmitted said signal, and if no reply or an erroneous reply is received said master unit may proceed with the step of detecting a vacant channel.

As specified in claim 14, the invention also relates to a system for transmitting signals, e.g. control signals, request signals, interrogation signals etc. comprising at least two units, wherein at least one of said units is designed to operate as a master unit and wherein at least one of said units is designed to operate as a slave unit, whereby said units are designed in order to be able to use a plurality of channels for the transmission, whereby a master unit is designed to perform the steps of detecting a vacant channel and transmitting a signal via said vacant channel, and whereby at least a slave unit is designed to perform the step of scanning the channels for transmitted signals.

Hereby a system is provided by means of which signals in an effective, reliable and relatively uncomplicated manner may be transmitted between units in a system utilizing more than one channel.

Advantageously, as specified in claim 15, said at least one unit designed to operate as a master unit may comprise control means for performing a scan of a plurality of channels.

In a preferred embodiment, as specified in claim 16, said control means may comprise means for operating in accordance with predefined algorithms.

Advantageously, as specified in claim 17, said at least one unit designed to operate as a slave unit may comprise control means for performing a sequential scan of the plurality of channels.

In a further preferred embodiment, as specified in claim 18, said system may be designed to operate in accordance with a method according to one or more of claims 1-13.

THE FIGURES

Figure 2:
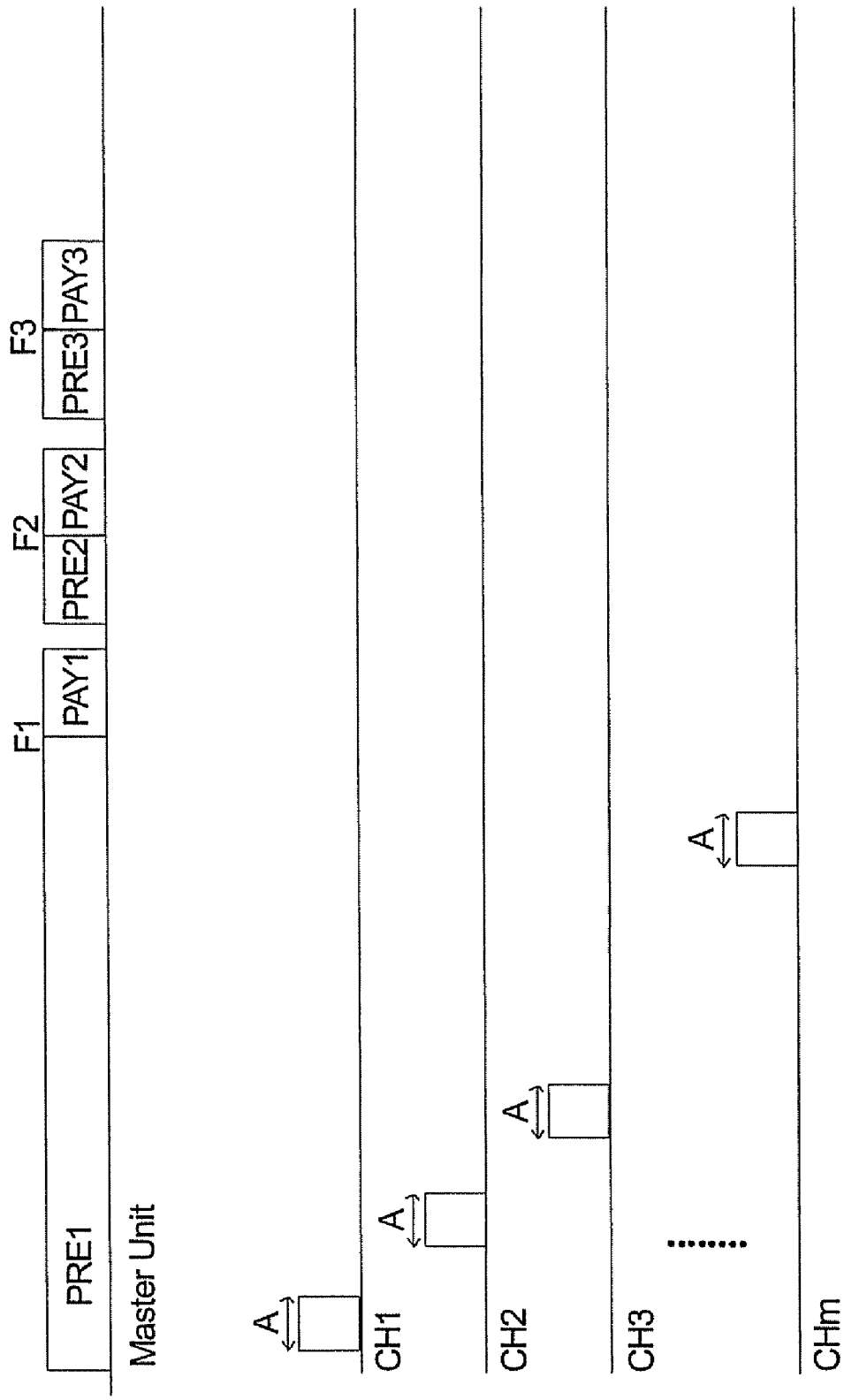
Figure 3:
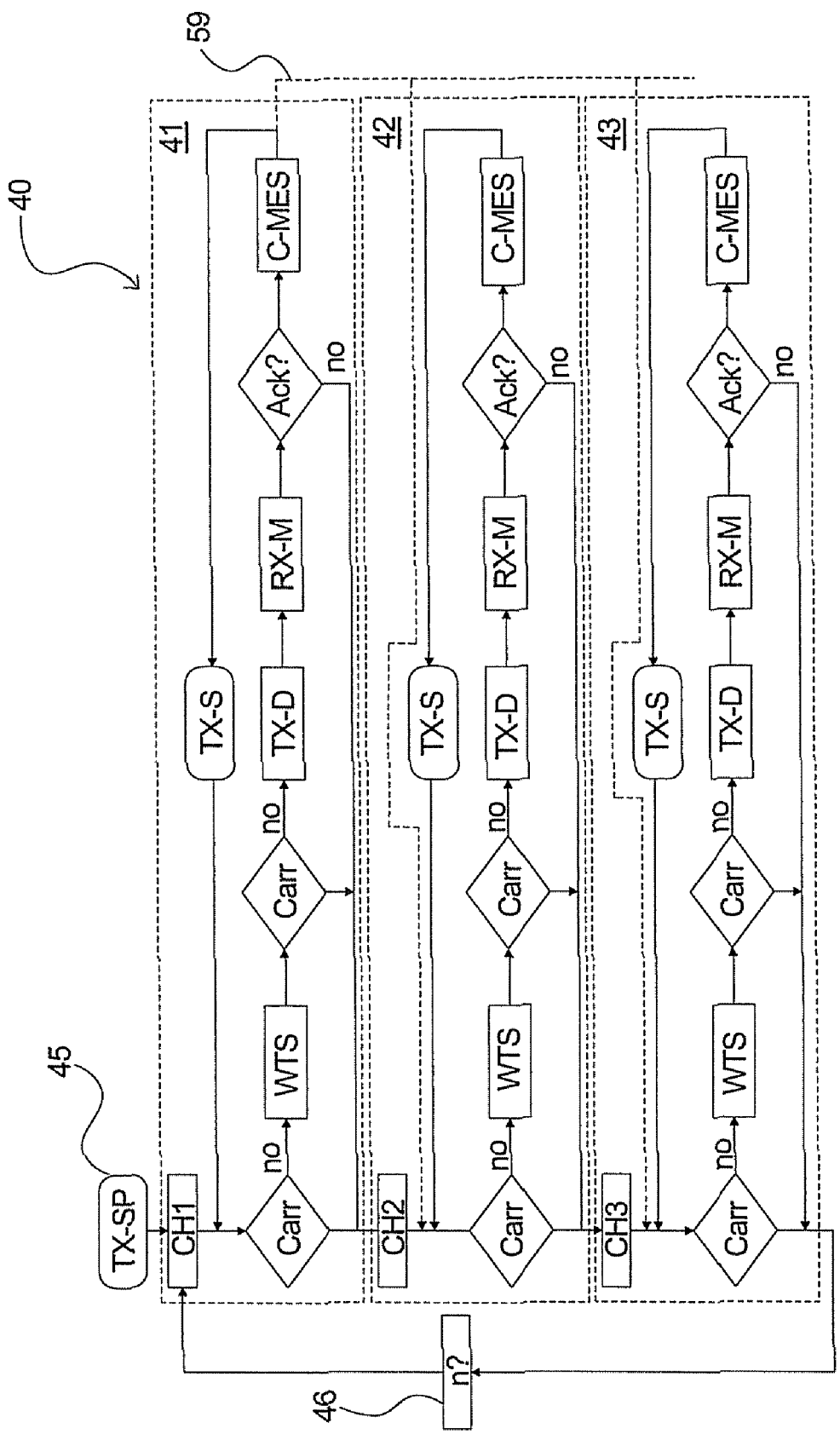

The invention will be explained in further detail below with reference to the figures of which FIG. 1 shows a general overview of a system according to an embodiment of the invention, FIG. 2 shows a structure of a message and in particular a first frame of such a message utilized in an embodiment of the invention, FIG. 3 shows a flowchart illustrating a transmit algorithm according to an embodiment of the invention, e.g. illustrating the operation of a master unit that initiates a transmission of data.

Figure 4:
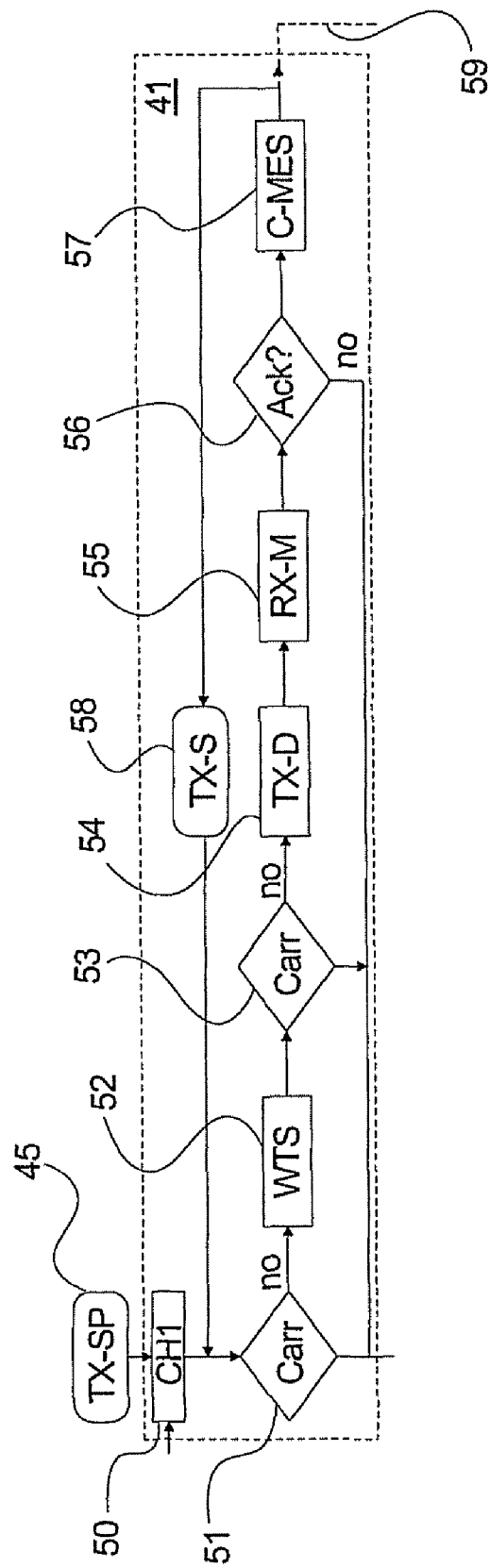
Figure 5:
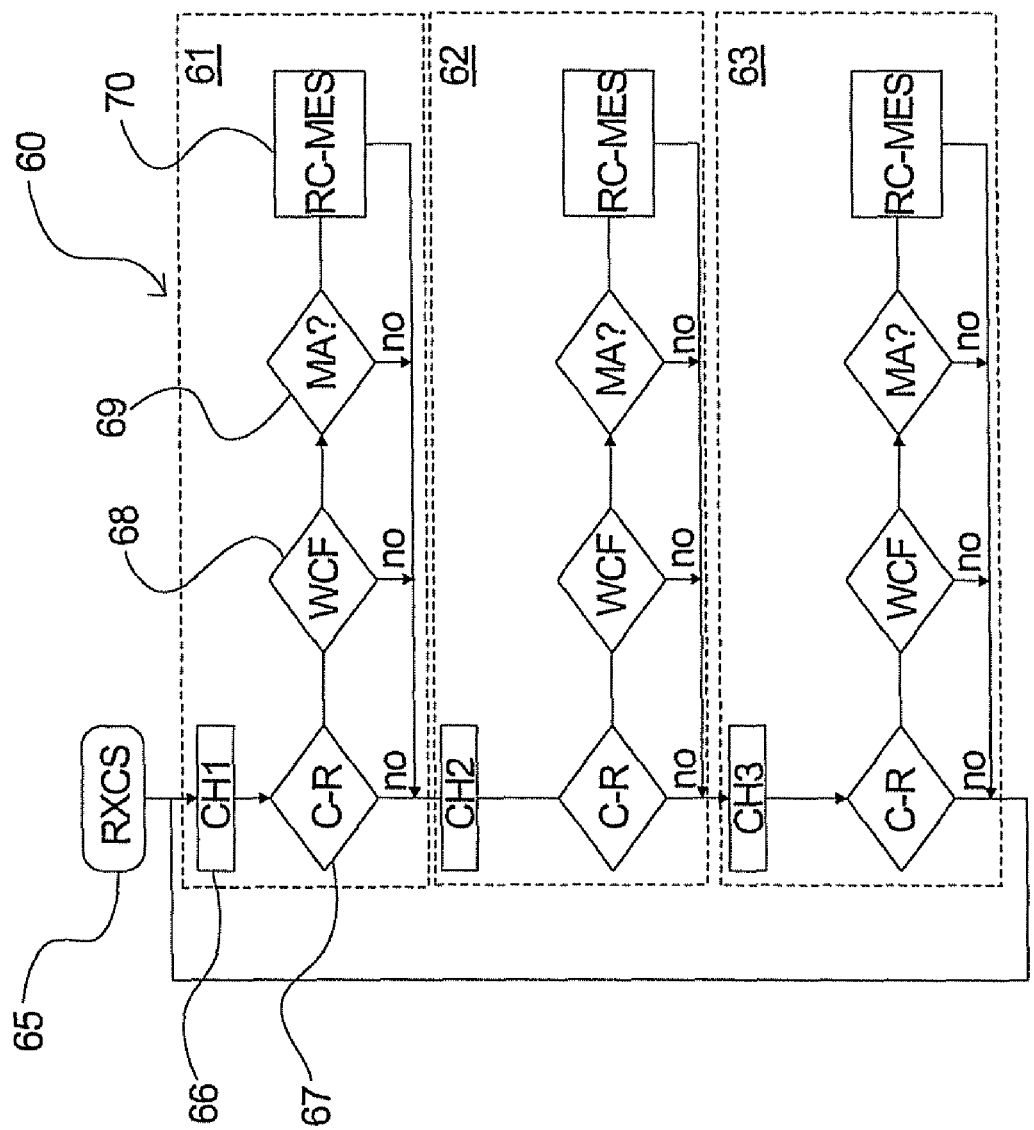
Figure 6:
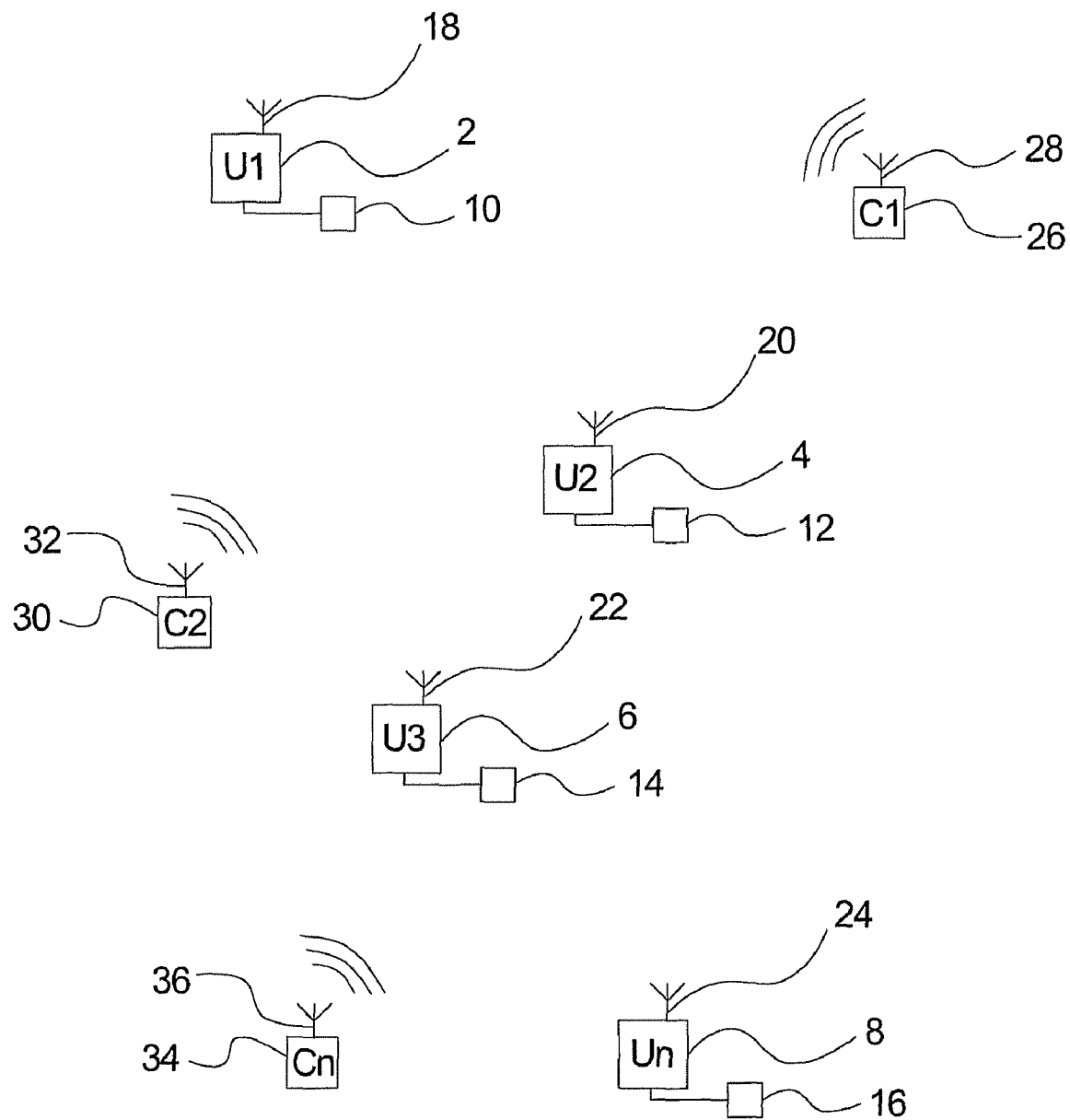

FIG. 4 shows a part of the flowchart of FIG. 3 in order to illustrate the invention in further detail, FIG. 5 shows a flowchart illustrating a reception algorithm according to an embodiment of the invention, e.g. illustrating the steps performed by a slave unit according to a embodiment of the invention, and FIG. 6 shows a general overview corresponding to FIG. 1 but with the units placed in a spatially different order.

DETAILED DESCRIPTION

FIG. 1 shows a general overview of a system according to a first embodiment of the invention. The system comprises a plurality of units 2, 4, 6, 8 (U1-Un) comprising or linked to for example drive units for various devices 10, 12, 14, 16. These devices may for example be activators of various types and used in a wide variety of applications, as explained in further detail later on. The units may also or instead comprise or be linked to assorted apparatus, measuring devices, indicating devices, controllers etc. that need to receive information, control signals etc. at certain points of time. A common feature of the units 2, 4, 6, 8 is that it is necessary or advantageous to be able to send some sort of information, signal etc. to the units. Further, it may be necessary or preferable to be able to receive information or signals from the units, e.g. confirmation signals, acknowledgement signals, measurement signals etc.

In the embodiment shown in FIG. 1, all units 2, 4, 6, 8 are equipped with receiving means for radio frequency signals, e.g. including antenna means 18, 20, 22, 24. Each unit comprises e.g. one or more motor drive units or control units and is connected to a driven or controlled member 10, 12, 14, 16. It will be understood that the means driven by, controlled by etc. the unit may be integrated with the unit. It will be understood that a system may comprise one or more units U1-Un and that, when more that one unit are involved, these may be similar or dissimilar and may control one or more similar or different devices. The units U1-Un will also be referred to as controllable units or slave units in the following.

The system further comprises a remote control unit (C1) 26 designed for transmission of signals by means of radio frequency transmission means, e.g. including antenna means 28. This control unit may be used for transmitting control signals or other types of signals to one or more of the units U1-Un in the system.

As illustrated the system may comprise at least one additional remote control unit (C2-Cn) 30, 34 similar to the first remote control, e.g. designed for transmission of signals by means of radio frequency transmission means, e.g. including antenna means 32, 36 or dissimilar to the first remote control, e.g. designed for transmission by other means such as wired means, infra red transmission means etc (not illustrated in FIG. 1).

The remote controls C1-Cn will also be referred to as controllers or master units in the following.

The units U1-Un and the controllers C1-Cn will also be referred to as nodes in the illustrated system.

The method of performing a communication between the units or nodes comprised in the illustrated system, e.g. between a master unit, e.g. the remote control 26 (C1), and one or more of the other (controllable) units U1-Un, which also will be described as slave units in the following, will now be described in further detail. It will be understood that in this context a master unit will imply a unit or a node in a communication system that initiates a transmission of data, and that a slave unit correspondingly will imply a unit that receives and responds to a transmission from a master unit. Thus, any of the units involved in the system illustrated in FIG. 1 may in principle take the role as a master unit as well as a slave unit in accordance with this definition.

The transmission of data between the units involved will take the form of a transmission of messages comprising a number of frames, packages or the like that are being transmitted between the units, e.g. a first frame from a first unit to a second unit, a second frame from the second unit to the first unit etc. A frame or a package comprises a number of bits that are transmitted consecutively. In a suggested embodiment of the invention, a message will contain two or four frames, but it will be understood that the number of frames, e.g. one, two, three, four, five etc. may be arranged according to the actual application and needs.

In order to achieve optimal communication between the units, a number of communication channels or frequencies may be used for the communication. It will be understood that more than one master unit may need to communicate with a slave unit at a specific point of time in the system illustrated in FIG. 1, and further it will be understood that a similar system comprising similar units may be situated nearby, e.g. whereby units from one system may occupy a channel needed for communication by units in the other system. In order to facilitate an optimal communication in these and other situations using a number of channels or frequencies, a frequency hopping technique is used in accordance with the invention.

In order to explain an embodiment of the invention, a possible structure of a message will be illustrated with reference to FIG. 2.

Here a first frame, F1, of a message transmitted from a master unit is illustrated, and subsequent frames F2 and F3 etc. are shown as well. Each of the frames comprises a preamble part PREn and a payload data part PAYn. The preamble PRE1 of the first frame F1 is substantially larger than the preambles of the rest of the frames in a message. The subsequent frames will serve to contain the actual information, control signalling etc, that are to be transmitted to a slave unit, whereas the preamble PRE1 of the first frame of a message will serve to alert a slave unit that a message is transmitted on a given channel as explained in further detail in the following.

The illustrated message is transmitted on a given channel in accordance with a procedure which will be described later on. When a message is transmitted, the intended receiver, e.g. the slave unit in question, will need to detect that such a message is transmitted on a channel. In order to do this, each of the slave units will scan all of the obtainable channels, e.g. CH1, CH2, ... CHm. In a time interval A, each slave unit will as illustrated examine, e.g. listen to, each channel for a message or rather a preamble comprised in a first frame of a message. Optionally, each slave unit may also in addition examine each channel for a carrier wave. Since this examination has a time duration of A, a preamble of a first frame of a message from a master unit will have to have a duration at least equal to m times A. Possibly, the duration of such a preamble PRE1 will also have to take into account the time needed for a slave unit to shift from one channel to the next.

Thus the illustrated first frame, F1, contains a preamble PRE1 serving the purpose of alerting the slave units, and further the preamble may contain particular information, e.g. system specific information giving the slave unit(s) the information that the message originates from a master unit related to the same system as the slave unit(s). For example, the preamble may contain the number 55h, corresponding to the bit sequence 01010101. Thus, if a slave unit detects a frame on a channel and detects the above bit sequence in the time interval A, it will stop the scanning procedure and listen to the channel in question.

Preferably, the method and the system according to the invention may be designed in such a manner that the bit sequence in question is repeated a number of times k in the preamble of a first frame of a message and that the slave units are designed in such a manner that the bit sequence in question will have to be detected a number of times 1 ($\leq$k) before a slave unit stops the scanning procedure and listens to the channel on which the bit sequence is detected. Thus, a slave unit may be set up to require a specific symbol to be detected one, two, three, four or more times before it is determined that a master unit is trying to transmit a message on a given channel.

If a noise signal is present on a channel there will be a certain probability that the predefined symbol will be stochastically present one time, but the likelihood that the symbol will be repeated one or more times will be significantly lower. By having the predefined symbol, e.g. the bit sequence repeated a number of times, and by having the slave unit detect the bit sequence a number of times before the slave unit decides that a message is transmitted via the channel in question, the risk of erroneous detection caused by noise signals on a channel is significantly reduced.

The communication according to the frequency hopping technique according to the invention will now be described in further detail with reference to FIGS. 3-5 which illustrate the operation of the transmitter, e.g. the master unit, and the receiver, e.g. the slave unit, respectively.

FIG. 3 shows a flowchart illustrating a transmit algorithm, e.g. illustrating the operation 40 of a master unit that initiates a transmission of data.

First, a transmit start step (TX-SP) 45 is performed, after which the master unit is ready for operation. The master unit will now investigate whether other units, including units of other types, marks etc. are utilizing the channels allocated to the system. This is done for all channel allocated to the system and will be described in further detail later on. If the first channel is not available, i.e. not vacant, the master unit will proceed to another channel etc. In FIG. 3 it is illustrated that three channels are allocated to the system, as illustrated by the subparts 41, 42 and 43, and the operations performed are essentially identical. If all of the allocated channels are non-available, the master unit will return to the first channel and proceed in a loop as illustrated. However, as shown by the block 46, a counter may be included and an upper limit n may be predefined. If a vacant channel is not found in n loops, the operation may be cancelled and possibly re-initiated after predefined time duration.

The operations performed in connection with a single channel will now be described with reference to FIG. 4, which corresponds to one on the subparts 41-43 in FIG. 3 and which uses the same references and abbreviations.

In the first step 50 of FIG. 4 a channel is selected, e.g. channel 1 (CH1). In the step 51 the master unit investigates whether a carrier wave (Carr) is present, e.g. by measuring the strength of the electromagnetic field. If this is the case, e.g. indicating that another transmitter is using the channel, the master unit will proceed to the next channel, CH2 etc. If a carrier wave is not present in the channel in question, a timeslot will be randomly selected, and the master unit waits until this timeslot is due (WTS) 52. In a preferred embodiment four timeslots, each having a duration of x ms, are involved that may be selected randomly. Evidently, fewer or more than four timeslots may be involved according to the invention. At the beginning of the selected timeslot, the presence of a carrier wave (Carr) is again examined 53. If a carrier wave is present, the system returns to the loop and proceeds to the next channel.

If a carrier wave is not present, the transmission of the data will be initiated (TX-D) in step 54. As already described in connection with FIG. 2, the preamble of the first frame of a message will be of a particular long duration, allowing the slave unit to be alerted. The operations performed by the slave unit(s) will be described later on.

When the transmission of data is completed, the master unit will go into receive mode (RX-M) 55 on the channel in question. If a response, e.g. an acknowledgement (Ack?) 56 from a slave unit is not received within a predefined time interval, the master unit will proceed to another channel. As indicated it may proceed to the next channel, but preferably it will jump randomly to another channel. Hereby it is avoided that the master unit in question and another master unit also trying to transmit data via a vacant channel will proceed in parallel and keep on colliding in their efforts to transmit data.

This will be explained in further detail with reference to FIG. 6, which shows the same system, e.g. the same units as depicted in FIG. 1, but located in a spatially different order. For example, the remote control unit Cn may try to transmit a message to the unit U2. Even though the master unit Cn has checked the channel for a carrier wave, another transmitter, for example the remote control C1, located at a distance from the master unit in question, may try to contact the slave unit, e.g. U2 via the same channel. Because the two master units in this situation, e.g. Cn and C1 are located relatively far from each other and possibly because of obstructions between these master units, the master unit in question, e.g. Cn, may not be able to measure the carrier wave from the other transmitter, e.g. C1. Both master units will then try to transmit data on the channel, but will fail in establishing a communication with the slave unit, e.g. U2. If both master units would then proceed to the next channel, there would be a risk that they would again collide, if they would happen to select the same random timeslot. Instead, they may both jump randomly to another channel, as explained above, whereby the risk of collision may be reduced. As explained above, the strategy for jumping to another channel may depend on a number of factors and may be performed in a number of ways, e.g. jump backwards, forwards, to a channel having a relatively large success rate, etc.

Further, the risk of collision may be reduced by enhancing the number of available time slots if an unsuccessful attempt of transmission has been performed. Thus, the number of available timeslots may be doubled in relation to the normal number of timeslots, etc, whereby the chance that two (or more) master units selects the same timeslot is reduced.

Returning to FIG. 4, it will be understood that if an acknowledge is received at 56, the communication will proceed on the channel in question, and a channel free-check will not be performed before transmitting subsequent frames. The subsequent frames will be transmitted with a preamble of a "normal" duration since an prolonged duration will only be necessary when a slave unit must find the correct channel as described above. When the transmission of the message comprising a number of frames is completed (C-MES) 57, the system may remain at the channel. If another message is to be transmitted, this may be initiated (TX-S) using the same channel as indicated at 58. The system will start such a subsequent transmission of a further message by checking for a carrier wave (Carr) at 51 as indicated. If a carrier wave is present, the system will proceed to the next channel etc. If a carrier wave is not present, the master unit will proceed as described above.

However, instead of remaining at the channel after having completed the transmission of the message, the system may jump to another channel as indicated by the punctuated line 59 in FIGS. 3 and 4. Such a jump may be caused by a number of factors and/or based on certain algorithms, statistical data etc. For example, information in the transmitted message may contain information regarding the channel to which the system shall jump when the transmission is completed. Further, the system may comprise data processing means and storage means, whereby information regarding the success rate for each channel is calculated and stored, and the system may be controlled in such a manner that it will jump to the channel having the largest success rate. Such an algorithm may be modified in order to take into account that a recent success is more valuable than a previous success, e.g. that a successful transmission achieved one hour ago is more valuable than a successful transmission three hours ago. A more simple algorithm will be to have the system jump to the channel having the largest success rate within the latest e.g. five or ten transmissions. Other ways of controlling the jump to other channels will of course be possible.

Next the operations of a slave unit will be explained with reference to FIG. 5 which shows a flowchart generally designated 60 illustrating the steps performed by a slave unit.

A slave unit not involved in a transmission and/or reception of data will continuously scan the channels allocated to the system, for example the three channels illustrated in the figures.

As shown in FIG. 5 the receiver channel search (RXCS) is initiated at 65, and the slave unit will start e.g. at channel 1 (CH1) at 66. As explained above it is examined (C-R) at 67 whether a certain predefined symbol, e.g. a certain number of bytes, e.g. 2, having a certain content, e.g. the number 55h corresponding to the symbol 01010101b is present, preferably repeated a number of times. Further, the slave unit may in addition examine whether a carrier wave is present. The detection of a carrier wave may be optional, since the detection of the predefined symbol, possibly repeated a number of times, will be sufficient to determine a request. Further, as previously described, the scanning must be performed within a limited time interval A.

If the predefined symbol is not read within the time interval, the slave unit will proceed to the next channel.

If the predefined symbol is present (in the predefined number of times 1, 2, 3, 4 etc.) and read within the time interval, the slave unit will interpret this as an indication of that a master unit has initiated a transmission, and that the master unit utilizes the method of communication according to the embodiment of the invention. However, a transmitter using another method of communication could be the transmitter of the signal received by the slave unit, but this would require that the same modulation and baud rate should be used and that the preamble should contain the same symbol (possibly repeated the predefined number of times) in the preamble.

When the slave unit recognizes the symbol of the preamble it will wait on the channel until the complete frame is received (WCF) as indicated at 68. If an error occurs or if a predefined time duration is exceeded, the slave unit will return to the channel scanning procedure.

If a complete frame is received, the slave unit will check that the frame is addressed to the slave unit in question (MA? My address) at 69. If not, the slave unit will return to the channel scan.

If the address is correct, the slave unit will respond on the channel to the master unit with a frame having a normal length. Further frames may be transmitted from the master unit to the slave unit and vice versa, and these frames will also be transmitted on the same channel (RC-MES) at 70, until the transmission of the frames with normal preambles is completed. After this, the system will return to the channel scanning.

If no further frames are received after the reply from the slave unit, or if an error occurs, the slave unit will return to the channel-scanning loop again.

The invention has been described above in general, but it will be understood that the invention may be particularly advantageous in connection with remote control of controlled aperture members such operable windows, doors etc, having a member which maybe opened and closed. Further, the invention may be utilized in connection with any member associated with e.g. a window, a door or a similar aperture member of a building, where it is desired and/or advantageous to be able to operate a movable member such as a curtain, blinds etc.

It will also be understood that the invention is not limited to the particular examples described above but may be used in connection with a wide variety of applications. In particular the invention may be used in application related to home information and/or automation systems, ventilation, heating, air conditioning systems etc. in buildings and similar structures, etc.

Further, it will be understood that the method and the system according to the invention may be designed in a multitude of varieties within the scope of the invention as specified in the claims.

For example, the number of available channels may vary in accordance with the particular circumstances and needs, e.g. a number of two, three, four etc. may be utilized. However, in order to achieve a relatively uncomplicated system, the number of channels are preferably less than e.g. 25, e.g. less than 20, less than 15, less than 10 etc.

Further, the number of units in a system may be varied within a relatively large interval and it will be understood that the units may be designed to be able to perform exclusively as master unit or as slave unit or some or all of the units may be able to take the role as both master and slave unit. The invention may of course include the situation where only two units, a master unit and a slave unit are involved.

LIST OF REFERENCES 2, 4, 6, 8 Receiver units, controllable units
10, 12, 14, 16 Controllable devices
18, 20, 22, 24 Antenna means
26, 30, 34 Control units, controllers, remote controls
28, 32, 34 Antenna means
40 Flowchart for master unit
41, 42, 43 Flowchart for each channel
45 Transmit start
46 Number of loops
50 Select channel
51 Carrier detection
52 Wait for random timeslot
53 Carrier detection
54 Transmission of data
55 Go to receive mode
56 Acknowledge
57 Complete total message transmission
58 Start of transmission
59 Jump to another channel
60 Flowchart for slave unit
61, 62, 63 Flowchart for each channel
65 Receiver channel search
66 Select channel
67 Detection of symbol and possibly also carrier wave
68 Wait for complete frame
69 My address (correct address)
70 Complete the total message

The invention claimed is:

1. A method of transmitting signals in a control system having at least two units operating on a plurality of transmission channels, one of the units operating as a master unit and the other of the units operating as a slave unit, the method comprising the steps of:
detecting a vacant channel among a plurality of transmission channels by a master unit;
transmitting a signal by the master unit via the vacant channel;
scanning the transmission channels by a slave unit for the transmitted signal, the transmitted signal having a preamble with a length corresponding at least to a period of time required for the slave unit to test the transmission channels and further comprising an address for the slave unit, the scanning step being interrupted when the slave unit detects a predefined system specific characteristic in the preamble of a received message;
waiting for a reply from the slave unit by the master unit when having transmitted said signal, and if no reply or an erroneous reply is received the master unit proceeds with the step of detecting the vacant channel by jumping to an another channel of said plurality of transmission channels in a non-sequential manner.

2. The method according to claim 1, wherein the master unit jumps to another channel by randomly selecting another channel of said plurality of transmission channels.

3. The method according to claim 1, wherein the master unit jumps to another channel by selecting another channel of said plurality of transmission channels in accordance with a predefined strategy.

4. The method according to claim 1, wherein the master unit tests said channel for a reply by waiting in a receive mode for a predetermined time.

5. The method according to claim 1, wherein the master unit transmits said signal via the vacant channel in a timeslot selected from a number of available timeslots and that said number of timeslots is enhanced when an unsuccessful attempt of transmission has been performed.

6. The method according to claim 1, wherein the step of detecting the vacant channel includes testing for a carrier wave.

7. The method according to claim 1, wherein the predefined system specific characteristic is one of a symbol, a bit sequence, a predefined number of bytes, a predefined content, and combinations thereof.

8. The method according to claim 1, wherein the interrupting step occurs when the predefined system specific characteristic is repeated at least once.

9. The method according to claim 1, wherein the slave unit performs the step of scanning said channels for a transmitted signal by testing for a carrier wave.

10. The method according to claim 1, wherein the master unit detects the vacant channel by scanning the plurality of channels in accordance with a predefined algorithm.

11. The method according to claim 10, further comprising the step of accounting by the master unit for previous transmissions.

12. The method according to claim 1, wherein the slave unit performs the step of scanning the transmission channels in sequential order.

13. A system for transmitting signals on a plurality of transmission channels, the system comprising:
a master unit configured to detect a vacant channel among a plurality of transmission channels and to transmit a signal on the vacant channel; and
at least one slave unit configured to scan the channels for the transmitted signal, wherein the signal transmitted by the master unit defining a preamble having a length corresponding at least to the time required for the at least one slave unit to test the channels for the transmitted signal, and the signal transmitted by the master unit further defining an address for the slave unit;
wherein the at least one slave unit further is configured to test a preamble of the transmitted signal for a predefined system specific characteristic in the preamble of a received message, and when having detected the predefined characteristic, interrupt the scanning and test the received message for an address;
wherein the master unit is configured to wait for a reply from the slave unit when having transmitted said signal, and if no reply or an erroneous reply is received the master unit is further configured to proceed with the step of detecting the vacant channel by jumping to an another channel of said plurality of transmission channels in a non-sequential manner.

14. A system according to claim 13, wherein the master unit is configured to jump to another channel by randomly selecting another channel of said plurality of transmission channels.

15. A system according to claim 13, wherein the master unit is configured to jump to another channel by selecting another channel of said plurality of transmission channels in accordance with a predefined strategy.

16. A system according to claim 13, wherein the master unit is configured to test said channel for a reply by waiting in a receive mode for a predetermined time.

17. A system according to claim 13, wherein the master unit is configured to transmit said signal via the vacant channel in a timeslot selected from a number of available timeslots and that said number of timeslots is enhanced when an unsuccessful attempt of transmission has been performed.

18. A system according to claim 13, further comprising control means for performing a scan of the channels.

19. A system according to claim 18, wherein the control means include means for operating in accordance with predefined algorithms.

20. A system according to claim 13, wherein the at least one slave unit includes control means for performing a sequential scan of the plurality of channels.

21. A system according to claim 13, wherein the predefined system specific characteristic to indicate to the system slave unit that the transmitted signal is a message originating from a master unit related to the same system.

* * * * *